United States Patent Office 2,816,279
Patented Dec. 10, 1957

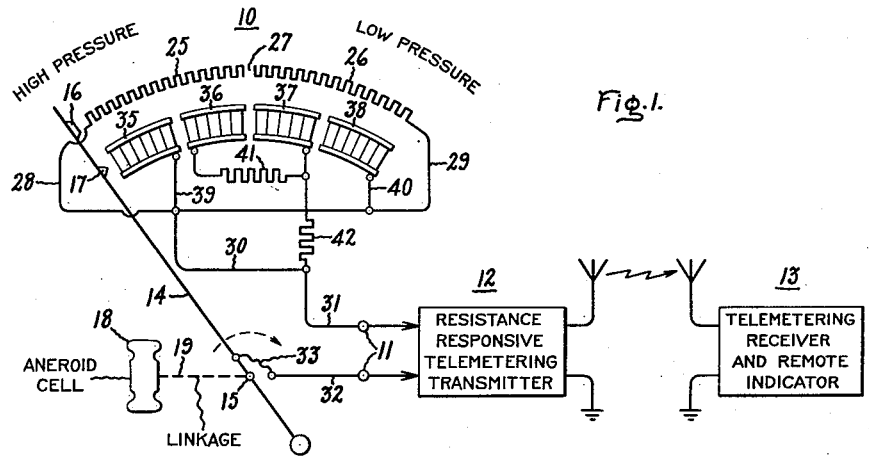
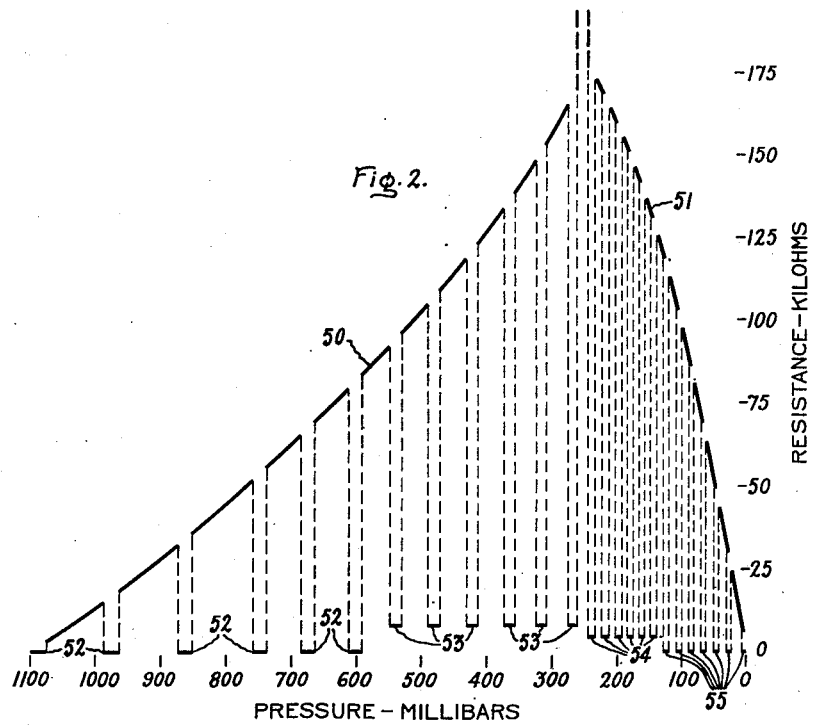
Inventor:
Bradford K. Hawes,
His Attorney.

2,816,279

CALIBRATED ELECTRICAL TELEMETERING INSTRUMENT

Bradford K. Hawes, Fairfax County, Va., assignor to General Electric Company, a corporation of New York Application January 27, 1950, Serial No. 140,889

8 Claims. (Cl. 340—177)

My invention relates to an electrical instrument for use in a telemetering system of the type wherein variations in an independent control quantity are translated into impedance variations in an electrical circuit for transmission to a remote indicating or recording point. The principal object of my invention is to provide an improved means for increasing the accuracy of calibration of such a telemetering instrument throughout its operating range.

Another object of my invention is to provide an improved electrical instrument, particularly for a telemetering transmission system, which provides a high degree of instrument accuracy over a wide range of control values.

Briefly, a preferred form of my invention utilizes a rheostat having an impedance-control arm whose movement is controlled by an independent variable quantity to be transmitted to a remote point. For example, the control quantity may be a function of voltage, current, velocity, pressure, temperature, etc. In accordance with my invention, as the control arm is moved over its operating range, it passes over a plurality of discrete calibrating points, and at each point a calibrating impedance of known value is introduced into the telemetering circuit. In this way a definite reference level is provided for instrument values adjacent each calibrating point. I also preferably employ different values of calibrating impedance over different portions of the operating range, these values being selected to provide most accurate measurement.

As another feature of a preferred form of my invention, a longer scale range is provided by employing two impedance sections arranged in such a way that movement of a common control arm in one direction first produces an impedance variation in one sense in the telemetering control circuit and then in the opposite sense. In this application of the invention, the provision of different values of calibrating impedance over different portions of the operating range eliminates any ambiguity which would otherwise result from having two different values of the control quantity indicated by the same impedance value, as well as providing more accurate measurements.

It is therefore specifically an object of my invention to provide an improved, wide-range control instrument for a telemetering system in which a plurality of different calibrating impedance values are selectively switched into the telemetering circuit so as to provide a high degree of accuracy and to eliminate any ambiguity in the interpretation of the impedance values in terms of a function of the independent control quantity.

For additional objects and advantages, and for a better understanding of the invention, attention is now directed to the following description and accompanying drawings. The features of the invention believed to be novel are particularly pointed out in the appended claims.

In the drawings:

Fig. 1 is a simplified schematic representation of a remote telemetering system incorporating an electrical telemetering instrument embodying my invention; and Fig. 2 is a graphical representation of certain operating characteristics of the instrument of Fig. 1.

In the illustrated form of the invention shown in Fig. 1, an electrical instrument 10 is arranged to provide a value of impedance between a pair of output terminals 11 which is varied as a function of an independent control quantity, in this case atmospheric pressure. These impedance variations are applied to any suitable form of telemetering transmitter 12 in order to modulate the signal transmitted toward a remote telemetering receiver and remote indicator 13. The elements 12 and 13 of the system are represented only in simplified block form, since their details form no part of my present invention. It will be understood by those skilled in the art that the output signal from transmitter 12 may be modulated in various ways in accordance with the value of impedance between terminals 11. For example, it may be modulated in amplitude, frequency, phase, pulse length, etc. As an illustration, my invention has particular utility in a radiosonde system of the type shown in my Patent 2,418,836, granted April 15, 1947, entitled "Remote Recording System," and assigned to the same assignee as the present invention. In this particular type of system, the transmitter 12 and instrument 10, together with other instruments producing resistance variations in accordance with temperature, humidity, etc., are arranged to be carried aloft by a balloon and to transmit data to a receiving station on the ground. The various control resistances are sequentially switched into the circuit of a blocking oscillator so as to vary the repetition rate of high-frequency pulses emitted by transmitter 12. For further details of suitable circuits for use in a radiosonde transmitter of this type, reference may also be made to the copending application of David J. Epstein, Serial No. 795,067, filed December 31, 1947, for "Pulse Generator," and also assigned to the same assignee as the present invention. On March 4, 1952, the Epstein application matured into Patent 2,588,098.

It will of course be understood that other suitable types of telemetering transmitting and receiving devices known to the art may be employed, and that the transmitter and receiver may alternatively be linked together over wire lines, carrier current circuits, etc.

The instrument 10 in Fig. 1 comprises a rotatable contact arm 14, pivoted at point 15 and carrying two metal contacts 16 and 17 near its upper end. Contact 16 preferably has a sharp knife-like contact edge and contact 17 a sharp contact point. The arm 14 is movable throughout a predetermined angular range by means of an aneroid cell 18 which is arranged to rotate arm 14 in conventional manner through a mechanical linkage 19, represented only schematically by a dashed connection. The angular position of arm 14 is thereby caused to be a function of barometric pressure.

The upper contact 16 is arranged to slide over two arcuate resistors 25 and 26 in succession as it moves through its operating range. Thus, the resistors 25 and 26, contact arm 14, and contact 16 comprise elements of two rheostats operated in succession by movement of arm 14. The adjacent ends of the two resistors are separated by a small gap 27, while their remote ends are connected together through respective conductors 28 and 29 and then through common conductors 30 and 31 to the upper one of the pair of output terminals 11. The lower one of the terminals 11 is electrically connected to the contact arm 14 and contact 16 through a conductor 32 and flexible connector 33. It will thus be observed that, as the arm 14 moves from the left-hand, or high pressure, position to the right-hand, or low pressure position, the resistance between terminals 11 first increases from zero up to the maximum value of resistor 25 and then decreases toward zero from the maximum value of resistor 26. There is also a very narrow interval at the gap 27 where the contact 16 does not engage either resistor, producing an open circuit. The purpose of the two resistor sections is to increase the sensitivity of the instrument, as will shortly be described in greater detail.

In accordance with my invention, the contact 17 selectively engages a multiplicity of very narrow, radial, contact bars at various discrete points in the path of travel of arm 14. As shown in Fig. 1, these contact bars are arranged in four groups, two groups 35 and 36 being associated with resistor 25 and the other two groups 37 and 38 being associated with resistor 26. The individual bars in each group are electrically connected together, as illustrated. In actual practice, I have found it convenient to bond the four groups 35–38 to a common strip of insulating material by means of printed circuit techniques.

It will also be observed that the two groups of bars 35 and 38 are connected directly to the upper terminal 11 through conductors 39, 40, 30 and 31. Thus, whenever the arm 14 is in such angular position that contact 17 engages any one of the individual bars in these two groups, a definite calibrating resistance (in this case, a substantial short-circuit) is connected in shunt to the active portion of the resistor 25 in circuit. When the contact 17 engages any one of the bars in the group 36, a different calibrating circuit is completed in shunt to the active portion of resistor 25 through resistances 41 and 42 in series. When contact 17 engages any one of the bars in group 37, a third calibrating circuit is completed in shunt to the active portion of resistor 26 through resistance 42 alone.

It will thus be seen that, as the arm 14 moves across either of the two resistors, a calibrating resistance of relatively low, known value is connected in parallel to the active portion of the resistor at a number of points near its low-resistance end, whereas a calibrating resistance of substantially higher, known value is connected in parallel with that resistor at a number of points near its high-resistance end. These values may also be different over the corresponding portions of the two resistors, in order to avoid any ambiguity as to which resistor is then in circuit. However, in the particular instrument illustrated in Fig. 1 there was no likelihood that an observer would confuse the extreme low-pressure indications with the extreme high-pressure indications, so it was more convenient to use a substantial short-circuit in both these ranges. Where there is any reasonable chance of ambiguity, it is preferable to use different low values of calibrating impedance for these two ranges.

The operation of the instrument 10 in Fig. 1 will be better understood by reference to the curves of Fig. 2. This figure shows the resulting variations in resistance at the output terminals 11, as ordinates, plotted against variations in atmospheric pressure, as abscissae. The heavy dashed curve 50 shows the variation in active resistance of resistor 25 as the atmospheric pressure decreases from a value corresponding approximately to sea level to approximately 250 millibars. The heavy dashed curve 51 similarly represents the variation in active resistance of resistor 26 as the pressure continues to decrease toward zero.

Assume now that the arm 14 is in its extreme left-hand position and that the radiosonde instrument is attached to a free balloon which is rising from near sea level. The net resistance across the output terminals 11 rises along the curve 50 as the atmospheric pressure decreases; but each time the contact 17 engages one of the short-circuiting bars in the group 35, the curve is interrupted, and the net resistance suddenly falls to zero at each of the calibrating points 52.

As the pressure continues to decrease, the contact 17 next successively engages the contacts in the group 36. Each of the resultant calibrating points 53 in Fig. 2 now has a higher resistance value, since the two resistances 41 and 42 are connected across the active portion of resistor 25. Since the resistances 41 and 42 will normally be selected to have relatively low values as compared to the total value of resistor 25, the net parallel resistance at terminal 11 will be largely determined by the calibrating resistances. For example, in one actual barograph embodying the invention, the resistors 25 and 26 each had a total resistance of 175,000 ohms, while calibrating resistances 41 and 42 each had a resistance of 5100 ohms. The net parallel resistance at each one of the calibrating points 53 therefore ranged between approximately 9200 and 9600 ohms over this portion of the operating range. Thus, all of the points 53 lie on an almost horizontal line, as represented in Fig. 2.

The operation over the remaining portion of the pressure-resistance characteristic will be obvious from what has just been stated. As the pressure continues to decrease, the contact 16 begins to traverse the resistor 26 in a decreasing direction and the calibrating resistance 42 alone is connected in parallel as the contact 17 successively engages each of the radial bars in the group 37. The resulting calibration points 54 in Fig. 2 thus lie along a different, nearly-horizontal line as compared to the line of the points 53. Thus, an operator is easily able to determine which portion of the pressure-resistance characteristic is being metered, and no confusion arises from the fact that, for each resistance value on the curve 50, there is a corresponding value on the curve 51.

Over the last portion of the operating range, each of the calibrating points 55 again corresponds to substantially zero resistance. However, as previously pointed out it may be desirable in some cases to use a finite value of calibrating resistance greater than zero. It just so happened that in this particular instrument, there was no possibility that an operator would be likely to confuse a resistance reading corresponding to a low altitude of the radiosonde balloon, immediately after launching, with values corresponding to extremely high altitudes where the pressure is approaching zero.

It will thus be appreciated that the use of the two rheostats in succession effectively doubles the instrument sensitivity, while the calibrating points eliminate any confusion in interpreting the impedance values at the remote indicator.

Another advantage of my improved calibrating system is that a high degree of measurement accuracy is secured at those points on the curves 50 and 51 where contact with the resistor is just being made or just being broken. By the proper choice of the width and spacing of the commutator bars and the values of calibrating resistance, the precise resistance values at the points of making and breaking contact may be very accurately calibrated during manufacture of the instrument, so that the measured resistance values at these points may be made practically independent of instrumental errors. I have found in actual practice that such an instrument can be calibrated at each of these points to an accuracy of one millibar or better and that the pressure errors can be reduced to the basic retrace accuracy of the instrument between calibrating points.

The dashed curves 50 and 51 of Fig. 2 are based on test curves taken from an actual radiosonde barograph embodying the invention, but in Fig. 2 the number of calibrating points has been reduced, and their width has been considerably exaggerated, in order to simplify the drawings. In actual practice there were a much larger number of commutator bars, and they were of such narrow widths that the resulting pressure indications at the remote recording instrument appeared to the eye of the observer as practically continuous traces.

While a specific embodiment has been shown and described, it will of course be understood that various modifications may be made without departing from the invention. The appended claims are therefore intended to cover any such modifications within the true spirit and scope of the invention.

What I claim as new and desire to secure by Letters Patent of the United States is:

1. In an electrical telemetering instrument, an impedance variable over a range of movement of an impedance-control member, means for actuating said member as a function of a control quantity, an output circuit controlled by said impedance variations, a plurality of calibrating impedances each of a different predetermined value, means controlled by said member for connecting one of said calibrating impedances in said circuit at a plurality of discrete points in one portion of said range, and means controlled by said member for connecting another of said calibrating impedances in said circuit at a plurality of discrete points in a different portion of said range.

2. In an electrical telemetering instrument, a pivoted arm carrying first and second contacts, a resistance arranged to be slidably engaged by said first contact throughout a range of angular movement of said arm, a multiplicity of narrow radial contact bars arranged to be selectively engaged by said second contact for short discrete angular intervals within said range, an electrical telemetering circuit connected through said first contact across a variable portion of said resistance, a plurality of calibrating circuit paths each of a different predetermined resistance, means for connecting each of said paths in shunt to said variable portion through said second contact and a different group of said bars, said groups lying within different angular sectors in the range of movement of said arm, and means for moving said arm to different positions within said range as a function of a control quantity.

3. In an electrical telemetering instrument, a rheostat having a contact member adjustable over a predetermined range of movement, an electrical telemetering circuit connected between one end of said rheostat and said member, a plurality of groups of contacts spaced along said range of movement, the individual contacts in each group being arranged to be selectively closed by said member at different discrete points within a particular fraction of said range, a corresponding plurality of calibrating impedances each having one terminal connected to all the contacts in one group and the other terminal connected to said one end of said rheostat, whereby each of said impedances is selectively connected in shunt to the active portion of said rheostat as said member closes the contacts within one fractional range, said impedances having different predetermined values which are progressively greater as said member moves away from said one end, and means for moving said arm as a function of a control quantity.

4. In an electrical telemetering instrument, a pivoted arm carrying first and second contacts, a pair of adjacent arcuate resistors arranged to be consecutively engaged by said first contact through a range of angular movement of said arm across both resistors, an electrical telemetering circuit having one terminal connected to the remote ends of both said resistors and the other terminal connected to said arm, four groups of narrow radial contact bars arranged to be individually engaged by said second contact at discrete points within a different fraction of the range of movement of said arm over each of said resistors, all bars in each of said groups being electrically connected together, first and second calibrating circuits each having a predetermined low impedance and arranged to be connected across said terminals through said second contact and one of the groups of bars nearest one of said remote resistor ends, third and fourth calibrating circuits each having a predetermined impedance substantially higher than said first and second calibrating circuits and arranged to be connected across said terminals through said second contact and one of the groups of bars nearest one of the adjacent resistor ends, and means for actuating said arm as a function of a control quantity.

5. In an electrical instrument, a variable impedance having a movable impedance-control member for providing increasing impedance values with movement of said member over one of a pair of consecutive paths of movement and decreasing impedance values with movement of said member over the other of said paths, means for moving said member in accordance with a control quantity, a pair of calibrating impedances of different, predetermined values, and means controlled by said first means for connecting each of said calibrating impedances in circuit with said variable impedance at a plurality of discrete points in a respective one of said paths of movement of said member.

6. In an electrical instrument, a variable resistance element having a movable control member for providing increasing impedance values with movement of said member over one of a pair of consecutive paths of movement and decreasing impedance values with movement of said member over the other of said paths, an output circuit controlled by the variations in said resistance, means for controlling movement of said member as a function of a control quantity, a pair of calibrating elements of different, predetermined resistance values, and means comprising a plurality of switching elements arranged to be selectively actuated by said member for connecting each of said calibrating elements in shunt with said variable resistance at a plurality of discrete points in a respective one of said paths of movement of said member.

7. In an electrical instrument, a variable impedance including a pair of impedance elements and a contact arm movable over said impedance elements in succession, an impedance responsive circuit connected between said arm and one terminal of each of said impedance elements, means for moving said arm over said impedance elements as a function of a control quantity, a pair of calibrating impedances of different, predetermined values, a plurality of spaced contacts disposed in two groups, each associated with one of said calibrating impedance elements, arranged to be selectively engaged by said arm in its path of movement, and means connecting each of said calibrating impedances in circuit with said variable impedance while said arm engages any one of the contacts in one of said groups.

8. In an electrical telemetering instrument, a pivoted arm carrying first and second contacts, a resistance including a pair of sections arranged to be slidably engaged in succession by said first contact through a pair of successive ranges of angular movement of said arm, a plurality of narrow, radial contact bars disposed in two groups, the contacts in each of said groups being arranged to be successively engaged by said second contact for short, discrete angular intervals with a respective one of said ranges, an electrical telemetering circuit connected through said first contact across a variable portion of said resistance, a pair of calibrating circuit paths of different, predetermined impedance values, means for connecting each of said paths in shunt with said variable portion through said second contact and a respective one of said groups of contact bars throughout each of said intervals, and means for moving said arm in response to a control quantity.

References Cited in the file of this patent

UNITED STATES PATENTS

| 1,626,560 | Schneider | Apr. 26, 1927 |
| 2,283,919 | Diamond | May 26, 1942 |
| 2,295,570 | Dunmore | Sept. 15, 1942 |
| 2,464,612 | Rich | Mar. 15, 1949 |
| 2,558,342 | Cosby | June 26, 1951 |